United States Patent [19]

DeHubry et al.

[11] Patent Number: 4,646,146
[45] Date of Patent: Feb. 24, 1987

[54] SURVEILLANCE CAMERA DEVICE WITH AUTOMATICALLY CONTROLLED SHUTTER

[75] Inventors: Frederick DeHubry, Überlingen; Günter Knon, Munich, both of Fed. Rep. of Germany

[73] Assignee: Dedo Weigert Film GmbH, Munich, Fed. Rep. of Germany

[21] Appl. No.: 688,616

[22] Filed: Jan. 3, 1985

[30] Foreign Application Priority Data

Jul. 23, 1984 [DE] Fed. Rep. of Germany ....... 3427115

[51] Int. Cl.$^4$ ........................ H04N 5/225; H04N 7/18
[52] U.S. Cl. ................................... 358/108; 358/228; 350/500; 352/141
[58] Field of Search ................. 358/108, 105, 93, 228, 358/225; 350/500; 356/5; 352/141

[56] References Cited

U.S. PATENT DOCUMENTS 3,652,154  3/1972  Gebel .................................. 358/228
4,386,848  6/1983  Clendenin et al. .................. 358/108

Primary Examiner—James J. Groody
Assistant Examiner—John K. Peng
Attorney, Agent, or Firm—Woodcock Washburn Kurtz Machiewicz & Norris

[57] ABSTRACT

A surveillance device consists of a video camera, a shutterless objective, a transmission optic element with an automatically controlled cat's eye shutter, and reflecting mirrors, for projecting an intermediate image generated by the objective into the video camera. The objective can swivel about both axes of the image, while a deflecting mirror is coupled to the objective in such a way that the intermediate image is always located in the same place.

7 Claims, 2 Drawing Figures

SURVEILLANCE CAMERA DEVICE WITH AUTOMATICALLY CONTROLLED SHUTTER

BACKGROUND OF THE INVENTION

The invention pertains to a surveillance device for monitoring and recording the servicing of vehicles, in particular, fast-moving vehicles or aircraft, and in particular a monitoring device with a camera having an automatically controlled shutter.

The devices previously employed for this purpose are usually modified 16 mm or 35 mm movie camera systems, whose objectives are equipped with a preset or automatically controlled shutter for the purpose of adaption to the illumination of the rapidly and significantly varying brightness of the object, the shutter however being sensitive against g-forces most of the time.

With such prior known camera systems it is impossible to evaluate the observations immediately as they are taken, because the film must first be developed. It is difficult to record the observations over long periods of time without a gap, since the quantity of film supplied is limited for reasons of space and weight. The automated objectives used are relatively large and heavy because of the extensive mechanical structure required for rapid shutter adjustment. This arrangement is especially undesirable if the camera is mounted behind an instrument panel, and there is only a little area for the objective available in the instrument panel. Also the iris shutters ordinarily used in the objectives tend, under the influence of large acceleration forces, to move spontaneously or to lock.

SUMMARY OF THE INVENTION

The object of the invention is to devise a surveillance device having a video camera with an automatically controlled shutter which requires only a small space in an instrument panel or the like, and which provides surveillance over a long period of time simultaneously with means for immediate evaluation of the observations made.

This object is achieved according to the invention by using a video camera as the camera and by arranging a shutterless main objective in such a way that an intermediate image is produced between the main objective and a transmission optic between the main objective and a video camera, the transmission optic being equipped with an automatically controlled shutter.

The surveillance device according to the invention has the advantage or being mountable in inaccessible places, and no film magazine or the like need be changed. The main objective installed for example in an instrument panel is shutterless and therefore, in cross section, practically only as large as the front lens. This main objective is also very easily replaced, since no transmission elements for shutter control have to be connected or disconnected.

The use of a cat's eye shutter as an automatically controlled shutter in the system of this invention has the additional advantage that the mechanical structure of the shutter and its control are simple and easy. The shutter lamellae of the cat's eye shutter need not come into contact. Thus, a locking up under the influence of accelerating forces is prevented, providing an advantage over prior systems used in the same sort of applications. The movement mechanism of the cat's eye shutter which controls the opening of the shutter can be rotated by 90° in a principal plane of the surveillance device, and therefore is especially space saving.

A cat's eye shutter with two shutter lamellae, each of which is mounted on a swiveling suspended arm, wherein the arms are connected with one another by crossarms, has the additional advantage that forces acting on one side of the shutter lamellae, e.g., accelerating forces, are compensated for and cause no spontaneous movement of the shutter.

A spontaneous movement of the shutter by external forces acting on the control is additionally prevented by activation of the shutter by a motor with a self-locking screw drive.

For the purpose of automatic illumination control, the shutter is advantageously operated as a functon of the brightness of the image detected by the video camera.

A field lens between main objective and the transmission optic increases the light output of the optic system in a simple manner.

In a preferred embodiment, deflecting mirrors are placed between the main objective, the field lens, the transmission optic, and the video camera. This enables the surveillance device to be made very small by guiding the beam path in a suitable manner, while the position of the main objective on the housing and its view direction can be suitably selected.

The main objective can swivel about both image axes, while a coupled-on deflecting mirror can be activated by a compensation mechanism in such a way that the intermediate image generated by the main objective always remains in the same place. In this way, despite the fact that the surveillance device is installed in a fixed position, the main objective can be precisely aimed at an object.

DESCRIPTION OF THE PREFERRED EMBODIMENT

Figure 1:
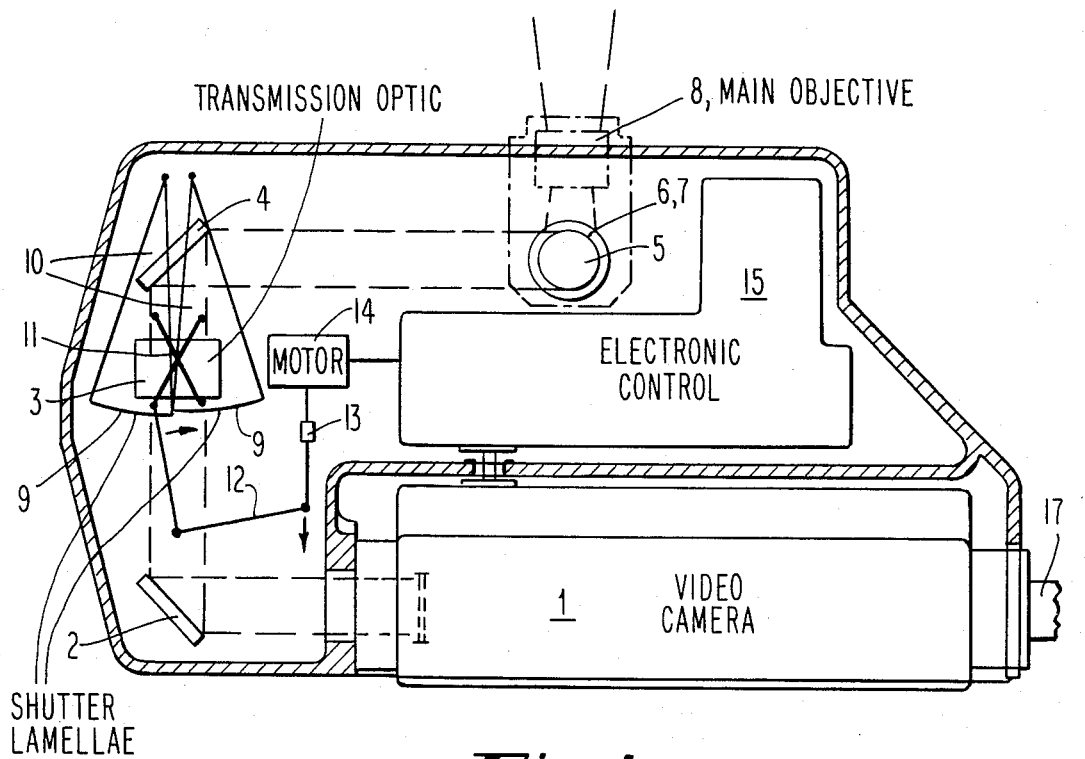
FIG. 1 shows a longitudinal section of the surveillance device according to the invention.
Figure 2:
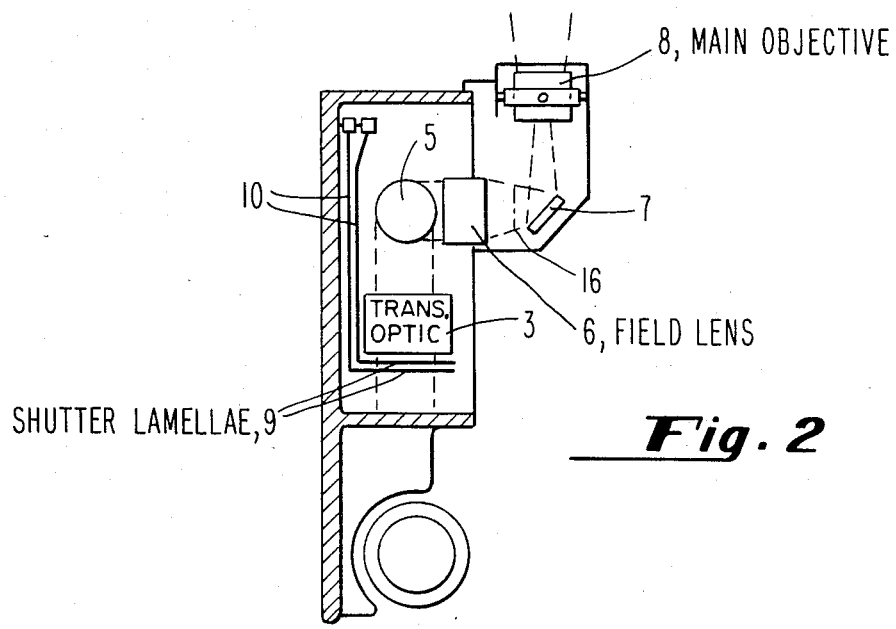
FIG. 2 shows a cross section of the surveillance device according to the invention.

Referring to the surveillance device as shown in FIGS. 1 and 2, the elements are described successively in the direction of the optic beam path, starting with the video camera 1. In order, there are arranged a deflecting mirror 2, a transmission optic 3, deflecting mirrors 4 and 5, a field lens 6, a deflecting mirror 7, and a shutterless main objective 8.

A cat's eye shutter which is formed by two shutter lamellae 9 is positioned at the output of optic element 3. The shutter lamellae are affixed to two arms 10 which in turn are suspended in a swiveling manner, the arms 10 moving in a plane parallel to the principal plane of the surveillance device. The arms 10 are connected by crossarms 11 so that when one of the arms moves, the other arm moves in the opposite direction. One of the arms 10 and one of the shutter lamellae 9 is connected via a joint connection 12 to a self-locking screw drive 13 which is actuated by a motor 14. The motor 14 is connected to an electronic control 15 and the latter to the video camera 1. The video camera 1 is connected via a cable 17 with a (not shown) monitor and/or a (also not shown) recording device.

The objective 8 can move about both image axes, i.e., its optical axis can swivel. The deflecting mirror 7 is coupled to the objective 8 in a common arrangement in such a way that a deflection of the objective is compensated optically. The objective 8 produces an intermediate image 16 between the deflecting mirror 7 and the field lens 6, whose image points are always in the same place even when the objective is displaced because of the suitably coupled deflecting mirror 7. The intermediate image 16 is projected into the video camera 1 via the field lens 6, the deflecting mirrors 5 and 4, the transmission optic 3, and the deflecting mirror 2.

The opening of the cat's eye shutter is governed by the electronic control 15 via by the motor 14 as a function of the brightness of the image detected by the video camera in such a way that the quantity of light incident to the video camer always corresponds to the optimum illumination.

We claim:

1. A surveillance device for monitoring and registering the servicing of vehicles, and in particular fast-moving vehicles, aircraft and the like, having a camera, a shutter and means for automatically operating said shutter as a function of the image detected by said camera, characterized by:
    said camera being a video camera;
    a shutterless main objective which is so arranged that an intermediate image is generated between said video camera and said main objective;
    a transmission optic element between said main objective and said video camera, for transmitting said intermediate image to said video camera, said automatically operated shutter being positioned to control the image transmission from said optic element to said camera; and
    said shutter being a cat's eye shutter comprising two shutter lamellae, a swiveling, suspended arm (10) corresponding to each of said shutter lamellae and mounting means for mounting each of said lamellae on a respective one of said arms, and crossarms connecting said arms to each other.

2. The surveillance device as in claim 1 characterized by a motor (14) and a self-locking screw drive (13) for activating said shutter (9).

3. The surveillance device as in claim 1, characterized by electronic control means for controlling said shutter (9) as a function of the brightness of the image detected by said video camera (1).

4. The surveillance device as in claim 1, characterized by a field lens (6) positioned between said main objective and said transmission optic element (3).

5. The surveillance device as in claim 1, characterized by deflecting mirrors positioned between said main objective (8), said field lens (6), said transmission optic element (3), and said video camera (1).

6. The surveillance device as in claim 1, wherein said main objective (8) can swivel about both image axes, and comprising a deflecting mirror (7) and coupling means for coupling said deflecting mirror to said objective in such a way that said intermediate image (16) always remains in substantially the same place.

7. A surveillance system for monitoring and recording fast moving scenes, having a video camera, a main objective, and optic path means for transmitting the image generated by said main objective to said camera, said optic path means further characterized by a cat's eye shutter mechanism and means for controlling said shutter mechanism as a function of the light intensity detected by said camera, said shutter mechanism comprising two shutter lamellae and respective arms carrying said lamellae, and coupling means for coupling said arms so that when one arm moves the other moves in the opposite direction.

* * * * *